May 13, 1952  H. F. CLARKE  2,596,529
VIBRATION MEASURING DEVICE
Filed Dec. 9, 1949

WITNESSES:

INVENTOR:
Howard F. Clarke

Patented May 13, 1952

2,596,529

UNITED STATES PATENT OFFICE 2,596,529

VIBRATION MEASURING DEVICE

Howard F. Clarke, Pullman, Wash., assignor to the United States of America as represented by the United States Atomic Energy Commission Application December 9, 1949, Serial No. 132,163

8 Claims. (Cl. 73—70)

This invention relates to apparatus for measuring and indicating small displacements. More specifically, the invention relates to an electronic system for measuring and indicating visually the characteristics of motion of vibrating objects. The present application is in part a continuation of copending application Serial Number 132,164, filed December 9, 1949.

A number of prior art arrangements are available for indicating by electrical means the characteristics of motion of vibrating bodies. In many such systems, an electro-mechanical translating device is coupled to the vibrating body in order to translate the physical quantities of vibration into electrical quantities. Such translating devices generally are of the piezo-electric or magneto-inductive type. In either case, a direct physical connection is necessitated between the vibrating body and the vibration sensitive element of the translating device.

Other prior art devices utilize light beam reflection off the vibrating object and translate the light beam displacements into electrical quantities by photo-cells. Devices of this type are difficult in utilization due to the necessity of light shielding and the necessity for rigid and elaborate apparatus placement.

It has been found that any form of direct physical coupling between the observed vibrating body and the translating element inherently creates a number of deleterious effects. Foremost among these is the loading effect on the vibrating body with resultant modification of its natural vibrating characteristics.

Another deleterious effect arises from the superposition of resonance characteristics of the coupling link between the translation element and the vibrating body on the vibration characteristics of the vibrating body per se. The electrical quantities derived under these conditions are not valid proportionalities to the motion of the observed body.

Other disadvantages are present in the prior art including adverse effects of vibration on the translating device. For instance, the piezo-electric translator is structurally delicate and if subject to even momentarily excessive vibration amplitudes, it is likely to fracture and thus be rendered useless. In addition, this type of translator is subject to deterioration due to environmental effects, such as for example, temperature and humidity. The magneto-inductive translator is also subject to deterioration due to fatigue and the imposition of stresses beyond the design value.

It follows from the foregoing that vibration measuring devices can be greatly improved by the elimination of mechanical coupling between the measuring device and the observed vibrating body.

The referenced copending application discloses a system for indicating the loci of instantaneous positions of a vibrating body relative to the mean position in which the only coupling with the vibrating body is an electro-magnetic field. The system comprises a source for inducing wave energy in a wave guide, means for supporting the vibrating body directly in the path of incident energy emitted from the wave guide so that wave energy is reflected back into the guide, and detector means for creating a varying unidirectional potential corresponding to the instantaneous conditions of the standing wave pattern in the wave guide which, in turn, corresponds to the positions of the vibrating body. The variable unidirectional potential so created may be impressed upon any well-known suitable type of indicator, but a calibrated oscilloscope is preferred to provide a visual trace corresponding to the loci of instantaneous positions of the moving body.

It has been found that although the system of the referenced application has meritorious characteristics for the measurement of vibratory displacements, the required apparatus is somewhat complex in adjustment and the response to very small displacements of the order of ⅛ inch and less is not sufficiently linear to effect desired accuracy.

Among the objects of the present invention, a principal object is to provide a vibration measuring device in which the only coupling between the device and the observed object is an electromagnetic field, and in which improved accuracy is obtained in the measurement of small displacements.

Other objects, features and advantages will appear in the following detailed description of a preferred embodiment of the invention. It is to be understood that this embodiment is only an illustrative example of practice and that the invention comprehends such other embodiments as come within the scope and spirit of the appended claims.

In the accompanying drawing made a part of this specification:

Heretofore, a vibration measuring device has been shown in which micro-waves are injected into a wave guide, and emitted from an open end thereof to impinge upon the observed vibrating surface. Part of the impinging energy is reflected back into the wave guide creating standing waves, the amplitude and position of which is a function of the instantaneous position of the observed surface.

In the present invention, the incident and reflected waves are separated by a directional coupler, and the change in amplitude of the reflected wave only is used as a dependent function of the position of the vibrating surface.

Figure 1:
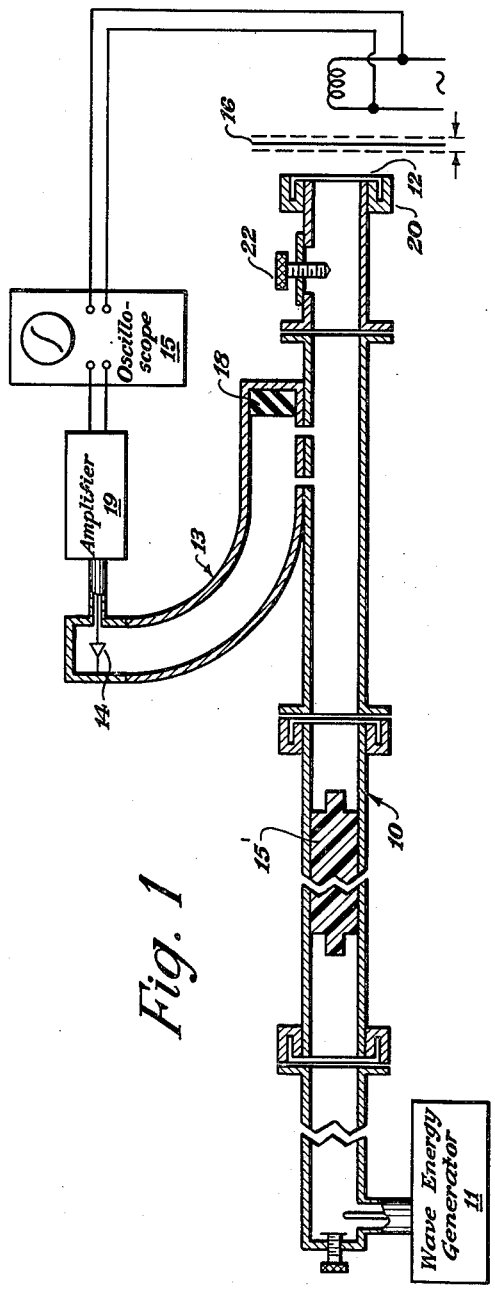
Figure 1 illustrates a practical embodiment, partly in section, of the invention.

Referring to Figure 1, a wave guide indicated generally by the numeral 10, is excited with wave energy by a wave energy generator 11. Wave energy travels through the wave guide and is emitted from the open end 12 thereof. The wave guide is aligned so that the open end thereof is opposed to the vibrating body 16 to be observed.

It has been found that the quantity of energy reflected back into the wave guide is critically dependent on the position of the reflecting surface.

The reflected energy only is permitted to pass into the directional coupler section 13 from whence it is impressed on a detector or rectifier 14. The unidirectional energy derived from the detector is amplified and impressed on an indicator, preferably in the form of an oscilloscope 15. The loci of positions of the vibrating body, therefore, appear as a trace on the oscilloscope.

The wave energy generator 11 is of the microwave type. In the embodiment shown, a klystron generating energy of approximately 3.2 centimeters was used. The klystron is particularly adapted as a wave generator, but is susceptible to frequency shift and amplitude changes if the applied load is not maintained constant.

The energy reflected off the observed body together with the incident energy in the wave guide creates a standing wave condition. Further, the standing waves shift to and fro synchronously with the displacements of the observed body. Since the impedance at any point is the ratio of potential to current at the point, the impedance fluctuates with variations in the ratio. To the end that the impedance facing the generator is substantially a constant, reflected energy is prevented from passing to the generator by the attenuator section 15'.

The incident wave energy travelling down the guide impinges on the observed body 16, and a quantity having a value depending on the momentary position of the body, is reflected back into the guide.

The directional coupler 13 has the characteristic of permitting the entry of wave energy only in the direction of original travel. Therefore, energy of the incident wave which enters the coupler is eliminated by an absorber 18. The reflected energy entering the coupler is passed on to rectifier 14 and is converted into unidirectional energy.

A detailed explanation of the directional coupler is presented in "Radio Engineering," third edition, pages 110, 111 and 114, published by the McGraw-Hill Book Company, 1947. The pertinent information present therein is incorporated in the present specification by reference.

The unidirectional energy derived from detector 14 is amplified in amplifier 19 and finally impressed on the vertical deflection terminals of oscilloscope 15.

Figure 2:
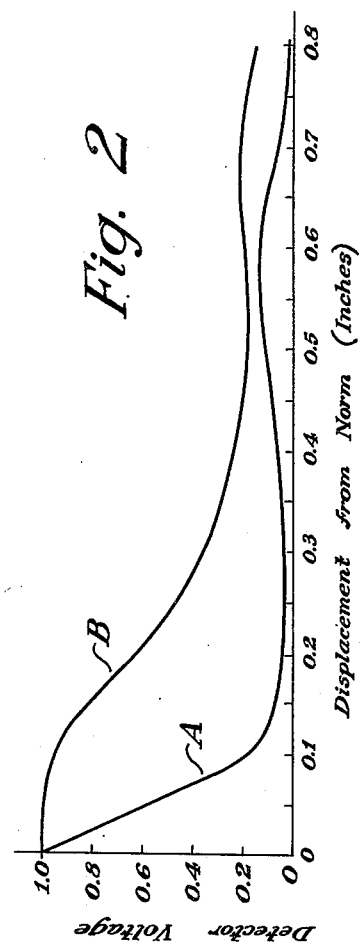
Figure 2 is a calibration chart showing indicator deflection versus observed body displacement.

The relation between vibratory displacement of the observed body and the oscilloscope trace obtained by the apparatus thus far described is shown in Figure 2, curve A. Referring to this figure, the potential indicated by the oscilloscope follows the solid line as the observed object is moved away from the open end of the wave guide. From observation, it is noted that the relation between potential indicated and displacement of the object is linear for only a very limited displacement of the object. In the example charted, linearity extends from approximately zero to 0.075 inch.

It has been found that the provision of a choke fitting on the free end of the wave guide extends the linear relationship. Figure 2, curve B, shows potential displacement of the apparatus of Figure 1 with the choke fitting 20 installed. The linear relationship of indicator reading to displacement extends from approximately 0.150 to 0.3 inch.

Choke fittings are also provided at the ends of wave guide section 10 to facilitate the coupling of this section with adjacent wave guide sections without the emission of wave energy out of the joint.

It has been found that the minimum indicator readings of curves A and B can be lowered and the linear relationship of indicator to displacement increased by the insertion of reflecting stub 22 between the directional coupler and the wave guide end. This stub is adjusted by positioning the observed object at a position corresponding to an indicator least value and tuning the stub until the indication is minimized.

The vibrating object of the embodiment of Figure 1 is shown as excited by an electro-magnet energized by an alternating current. This method of excitation is desirable wherever applicable for the reason that the horizontal sweep of the oscilloscope can be synchronized in the usual manner by the said alternating current. The oscilloscope indication is thereby rendered stationary in a ready manner.

A further advantage of apparatus constructed in accordance with this invention lies in its capability of measuring frequency of vibration. The calibrated sweep oscillator of the oscilloscope is adjusted to visually indicate the fundamental pattern of vibration. The rate for this condition is accordingly equal to the sweep frequency. In the event the rate of vibration is lower than any calibrated sweep frequency, Lissajous figures can be used.

It has been found that the output of the detector is amplified most conveniently by square wave pulsing of the micro-wave generator 11. The modulation is of square shape in order to prevent frequency deviations of the generator. A considerable advantage of this arrangement is that the amplifier can be tuned to the modulation frequency and therefore can be made very sensitive without responding to stray signals induced in the apparatus from stray sources.

What is claimed is:

1. Apparatus for measuring small displacements comprising an electromagnetic wave guide having an open end adapted to be directed toward an object the displacements of which are to be measured, an electromagnetic micro-wave generator coupled to the wave guide remote from the open end, a directional coupler coupled to the wave guide and orientated to pass energy travelling from the open end, a detector coupled to said directional coupler and connected to an indicator whereby an indication is effected as a function of the quantity of wave energy passing into the wave guide from the open end thereof.

2. Apparatus for measuring small displacements comprising an electromagnetic wave guide having a closed end, and an open end adapted to be directed toward an object the displacements of which are to be measured, a source of wave energy, coupling means for coupling the wave energy source into the wave guide proximate the closed end, a directional coupler coupled to the wave guide between the coupling means and the wave guide open end and oriented to permit only energy travelling inward from the wave guide open end to pass thereinto, rectifier means for rectifying wave energy passing through the directional coupler, and indicator means coupled to the rectifier means for providing indications corresponding to the quantities of wave energy entering the wave guide open end.

3. Apparatus for measuring vibratory displacements comprising an electromagnetic wave guide having an open end adapted to be directed toward an object the vibration of which is to be measured, an electromagnetic micro-wave generator coupled to the wave guide, a rectifier, means coupling the rectifier to the wave guide selective to reflected energy travelling inward from the open end, and indicator means connected to the rectifier to thereby effect indications corresponding to instantaneous positions of the said object.

4. In a vibration measuring device, a section of electromagnetic wave guide having an open end, means for injecting electromagnetic wave energy into the wave guide, means supporting the wave guide with its axis intercepting a vibrating object to be observed and with its open end positioned opposite and closely proximate to the said object whereby incident energy impinging on the object is reflected back into the wave guide, a directional coupler connected to the wave guide between the energy injecting means and the open end and orientated to accept only reflected energy, a rectifier coupled to said directional coupler, and a visible indicator means connected to the rectifier to translate detected potentials into visible indications.

5. In a vibration measuring device, a section of electromagnetic wave guide having a first and a second end, said second end being open and adapted to be positioned opposite a vibrating object to be tested, means for injecting electromagnetic wave energy into the wave guide proximate the first end, a directional coupler connected to the wave guide between the wave energy injecting means and the second end, said directional coupler being so orientated as to accept reflected energy travelling inward from the second end, a rectifier coupled to the directional coupler and an indicator connected to the rectifier, and attenuator means positioned in the wave guide between the energy injecting means and the directional coupler connection to the wave guide.

6. In a vibration measuring device, a section of electromagnetic wave guide having a first and a second end, said second end being open and having a choke fitting affixed thereto, said second end and choke being adapted to be positioned opposite a vibrating object to be tested, means for injecting electromagnetic wave energy into the wave guide proximate the first end, a directional coupler connected to the wave guide between the wave energy injecting means and the second end, said directional coupler being so orientated as to accept energy travelling inward from the second end, a rectifier coupled to the directional coupler and an indicator connected to the rectifier, and attenuator means positioned in the wave guide between the energy injecting means and the directional coupler connection to the wave guide.

7. In a vibration measuring device, a section of electromagnetic wave guide having a first and a second end, said second end being open and having a choke fitting affixed thereto, and being directed toward a vibratory body, electrodynamic means for vibrating said body, means for injecting electromagnetic wave energy into the wave guide proximate the first end, a directional coupler connected to the wave guide between the wave energy injecting means and the second end, said directional coupler being so orientated as to accept reflected energy travelling inward from the second end, a rectifier coupled to the directional coupler and to one pair of oscilloscope plates, attenuator means positioned in the wave guide between the energy injecting means and the directional coupler connection to the wave guide, and electrical coupling means connected between said electrodynamic means and the remaining pair of oscilloscope plates, whereby the excursions of the vibratory body are shown as a visual trace.

8. In a vibration measuring device, a section of electromagnetic wave guide having a first and a second end, said second end being open and having a choke fitting affixed thereto, and being directed toward a vibratory body, electrodynamic means for vibrating said body, means for injecting electromagnetic wave energy into the wave guide proximate the first end, a directional coupler connected to the wave guide between the wave energy injecting means and the second end, said directional coupler being so orientated as to accept reflected energy travelling inward from the second end, a rectifier coupled to the directional coupler and to one pair of oscilloscope plates, an adjustable stub inserted in said wave guide between the connection with the directional coupler and the said second end for adjusting said oscilloscope to a null indication corresponding to the at-rest position of the vibratory object, whereby the excursions of the vibratory body are shown as a visual trace.

HOWARD F. CLARKE.

REFERENCES CITED

The following references are of record in the file of this patent:

UNITED STATES PATENTS

| Number | Name | Date |
| --- | --- | --- |
| 2,403,289 | Korman | July 2, 1946 |
| 2,482,173 | Hagstrum | Sept. 20, 1949 |
| 2,512,191 | Wolf | June 20, 1950 |
| 2,519,734 | Bethe | Aug. 20, 1950 |